Patented Mar. 10, 1931

1,795,676

UNITED STATES PATENT OFFICE

CINDERELLA RAISCH, OF DINUBA, CALIFORNIA

SILVER CLEANING AND POLISHING COMPOSITION

No Drawing.   Application filed March 24, 1930.  Serial No. 438,645.

This invention relates to a silver cleaning and polishing composition, and an object of the invention is to provide a composition in powder form that when added to water will clean the tarnish from silverware without rubbing.

Another feature of the present invention is to provide a silver cleaning and polishing composition that will not stain the hands when being used.

Further objects of the invention are to provide, in a manner as hereinafter set forth, a composition of the character referred to that is very simple in texture, requiring the minimum of technical skill and comparatively inexpensive to manufacture and use.

With the foregoing and other objects in view, the invention consists of a novel combination and arrangement of ingredients, as will be hereinafter more specifically described and illustrated in the accompanying specification, but it is to be understood that changes, variations and modifications, may be resorted to without departing from the spirit of the claims hereto appended.

In its broadest aspect, the invention consists of a mixture of powdered sodium chloride, quinine chloride and a deliquescent agent in the form of magnesium sulphate, to all of which are added about four drops of indigo coloring liquid.

These ingredients are dissolved in a quart of water and brought up to a temperature slightly under the boiling temperature, whereupon the silverware is dipped in the hot solution for a period of one-half to one minute. Then the silverware is to be washed in clean soapy water and wiped dry, whereupon a high gloss and a clean surface will result from the foregoing treatment.

To be more specific, a composition will be set out below, that has given very satisfactory results:—

Sodium chloride_____ 8 ounces
Quinine chloride_____ 1 ounce
Magnesium sulphate_____ 1½ ounces
Indigo liquid coloring_____ 4 drops The powdered sodium chloride is mixed with quinine chloride and magnesium sulphate in the powdered form and thoroughly agitated until a homogeneous powdered mixture results.

Thereafter, four drops of liquid blue coloring matter are added to the powder and stirred until the liquid permeates the mixture of powders. The above proportions are very satisfactory to be used in one quart of water, varying the proportions to suit the volume of water used. The above mixture of powders containing the liquid coloring matter are placed preferably in an aluminum kettle and brought to a temperature slightly under the boiling point. At this temperature slightly below the boiling point, the silverware is dipped into the solution for a period from one-half to one minute, and then the silverware is removed therefrom and washed in soapy water to remove the composition.

The resulting silverware treated as aforesaid, has a high polish and has been thoroughly cleaned from all dirt and tarnish.

The quinine chloride is used in the composition to neutralize the acid which might be brought out in the composition. The sodium chloride used in the composition cleans any foreign matter from the silverware and greatly enhances the cleaning properties of the composition.

Magnesium sulphate when added to the composition takes up moisture and prevents the powder from hardening. The combination of the salt and indigo gives the silver a bright, new and shiny lustre, while it has been found that treatment without the blue indigo, has a considerably duller finish.

It is to be understood that by describing in detail herein any particular mixing, form, or sequence of operation, it is not intended to limit the invention, beyond the terms of the several claims, or the requirements of the prior art.

Having thus described my invention, what I claim as new is:—

1. A silver cleaning and polishing composition comprising sodium chloride, quinine chloride, magnesium sulphate and indigo.

2. A silver cleaning and polishing composition comprising a powdered mixture of eight ounces of sodium chloride, one ounce of quinine chloride, one and one-half ounces of magnesium sulphate to which is added four drops of indigo.

3. A silver cleaning and polishing composition comprising a powdered mixture of eight ounces of sodium chloride, one ounce of quinine chloride, one and one-half ounces of magnesium sulphate to which is added four drops of indigo, and all the ingredients to be added to one quart of water.

In testimony whereof I affix my signature.

CINDERELLA RAISCH.